Oct. 25, 1966     B. P. BLASINGAME     3,281,655

INDUCTIVE MULTI-SPEED RESOLVER

Original Filed Oct. 8, 1959

INVENTOR.
Benjamin P. Blasingame
BY
Hugh L. Fisher
ATTORNEY

United States Patent Office 3,281,655
Patented Oct. 25, 1966

3,281,655
INDUCTIVE MULTI-SPEED RESOLVER
Benjamin P. Blasingame, 2621 E. Menlo Blvd., Milwaukee, Wis.
Original application Oct. 8, 1959, Ser. No. 845,242, now Patent No. 3,172,023, dated Mar. 2, 1965. Divided and this application Dec. 1, 1964, Ser. No. 415,134
9 Claims. (Cl. 323—51)

This application is a division of copending application Ser. No. 845,242, filed on Oct. 8, 1959, now U.S. Patent 3,172,023, granted on March 2, 1965.

This invention relates to resolvers and more particularly to an improved inductive-type resolver which provides an output related in phase to the disposition of a magnetic body relative to a plurality of magnetic poles.

Present day resolvers are electromechanical devices which provide an alternating current signal voltage whose phase differs from that of a reference voltage by an amount precisely equal to the shaft rotation of the resolver. This action is accomplished by means of a four pole stator containing two field windings excited by voltages which are precisely 90° out of electrical phase with respect to each other inside of which a two pole armature containing a single winding is rotated by the resolver shaft. This field arrangement is essentially analogous to that of a two phase induction motor wherein field windings are excited 90° out of electrical phase to produce a rotating magnetic field. The single armature winding of the resolver acts like the secondary of a transformer having induced in it the sum of voltages from both field windings. The voltage induced by each field winding is porportional to the sine of the angle between the axis of the armature and the axis of the field pole. Thus the armature voltage is given by the mathematical expression:

$$e_{out} = n_1 e_1 \sin \omega t \sin \alpha + n_2 e_2 \sin (\omega t - \pi/2) \sin (\alpha - \pi/2)$$

where:

$e_{out}$ = armature voltage magnitude.
$n_1$ = turns ratio of armature to pole number 1.
$e_1$ = voltage magnitude impressed on field number 1.
$\omega$ = frequency of excitation voltage in radians/sec.
$t$ = time in seconds.
$\alpha$ = angle between axis of armature winding and field pole number 1.
$n_2$ = turns ratio of armature to pole number 2.
$e_2$ = voltage magnitude impressed on field number 2.

Since the armature is rigidly fastened to the resolver shaft, $\alpha$ is also the angle of the resolver shaft with respect to the reference position.

This may be rewritten:

$$e_{out} = n_1 e_1 \sin \omega t \sin \alpha - n_2 e_2 \cos \omega t \cos \alpha \quad (1)$$

If now $n_1$ is made equal to $n_2$ by manufacture and $e_1$ is made equal to $e_2$ by the excitation provisions, then applying the formula $$\cos (x+y) = \cos x \cos y - \sin x \sin y$$

This may be rewritten:

$$e_{out} = n e_{in} \cos (\omega t + \alpha) \quad (2)$$

It is now seen that the output voltage is shifted in electrical phase by exactly the shaft angle, $\alpha$.

A device of this type has many uses in analogue computations, data transmission and general instrumentation applications. The phase shift angle and hence shaft angle may be digitalized by suitable pulse counting systems. Where a shaft position must be measured to extreme precision, gearing is sometimes introduced between the shaft and the resolver. By gearing up the resolver, the phase angle can thus be made to rotate through 360 electrical degrees for some fraction of a complete rotation of the shaft. This introduces an ambiguity in the actual shaft position which must be accounted for by some means such as another "single speed" resolver. Such applications are common in the present instrumentation art.

Two problems in the use of resolvers are the inaccuracy, backlash and expense introduced by gearing resolvers for high accuracy and the electrical and mechanical problems attending the use of slip rings and brushes to connect the armature windings to the resolver terminals. The former problem limits the accuracy of such systems to the accuracy of gear trains and the latter limits the applications to environments which are relatively free of vibration, corrosion, etc.

According to the present invention an inductive resolver or displacement measuring device is provided which produces an output related in phase to the position of a relatively displaceable member, which member is completely free from windings thereon. In addition, the invention provides for a multi-speed inductive resolver which does not require the use of a mechanical gearing with the difficulties attendant thereto. In general, this is accomplished by the provision of a plurality of salient magnetic poles and magnetic flux return means spaced therefrom to define a plurality of flux gaps. Both primary and secondary windings are associated with each of the poles so as to be linked magnetically to a degree dependent upon the orientation of a magnetic body which is displaceable through the gap relative to the poles. By exciting the various primary windings with voltages having predetermined phase angle differences, a secondary voltage may be produced which is related in phase to the position of the magnetic body relative to the poles.

In a particular embodiment of the invention a multi-speed inductive resolver is provided which produces an output signal which varies in phase directly with displacement of a relatively movable body. This displacement phase characteristic may be accomplished by graduating the dimensions of the movable body such that the area of the movable body which is presented to the adjacent poles varies approximately sinusoidally with displacement of the body.

The present invention may be best understood by reference to the following specification which describes two illustrative embodiments of the invention. These descriptions are to be taken with the accompanying figures of which:

Figure 1:
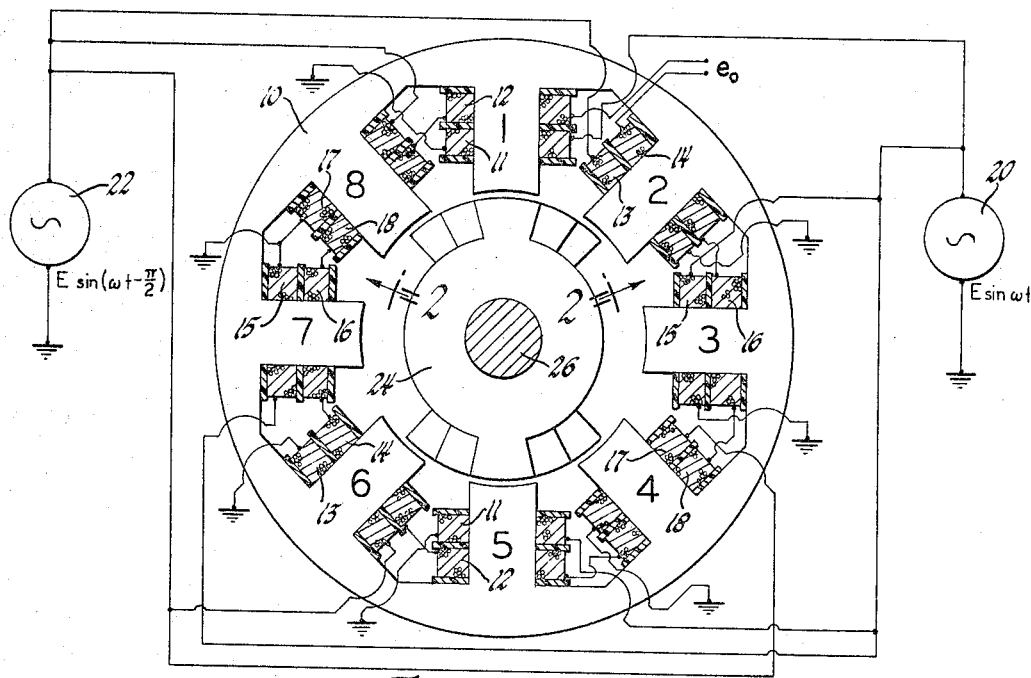
FIGURE 1 is a cross-sectional view of a two-speed inductive resolver.

FIGURE 1 shows an enlarged sketch of an inductive multi-pole resolver for which the name microsolver has been coined. This sketch shows a two speed microsolver—the output voltage changes phase through 360 electrical degrees while the shaft turns through 180°. This is the lowest speed to which this design can be applied. On the other hand higher speeds can be built the upper limit being fixed only by the allowable frame size and the practical limitations on the intricacy of the punching of the laminations for the pole pieces.

Referring specifically to FIGURE 1, the microsolver consists of a field core structure 10 of laminated magnetic material having eight salient poles numbered 1 through 8. Each pole carries two solenoid type windings one being a primary to which the excitation voltage is applied and the other a secondary in which the output voltage is induced by transformer action. These poles and field windings are arranged in pairs, in the sketch the odd numbered poles form one set of pairs which are all excited in phase with the reference voltage. Thus solenoid coils pairs 11 and 15 are connected in parallel to the reference excitation voltage source 20. Solenoid coil pairs 13 and 17 are connected in parallel and excited 90 electrical degrees out of phase with the reference electrical voltage by quadrature voltage source 22. Thus a rotating magnetic field is produced essentially as in the field of an induction motor. To do this, it is clear that the parallel connected solenoids are reversed in each pair so that in reality coil pair 15 is excited 180 electrical degrees out of phase with coil pair 11. Similarly coil pair 17 is excited 180 electrical degrees out of phase with coil pair 13.

Figure 2:
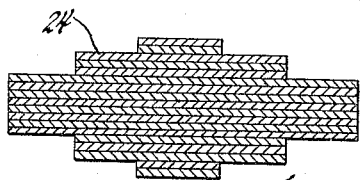
FIGURE 2 is a view of the end surface of the rotor of the inductive resolver shown in FIGURE 1 and taken along a line 2—2 of FIGURE 1.
Figure 3:
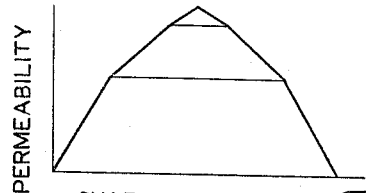
FIGURE 3 illustrates the variation of permeability in a representative flux gap adjacent one of the poles when a rotor structure such as shown in FIGURE 2 is displaced thereby.

Consider now the function of the rotor 24 which is connected to and turned by shaft 26. The rotor is made of punched laminations, for example, of high permeability magnetic material. The periphery of the rotor makes a very large air gap with the field pieces except where it has been extended to a larger radius. In the position shown, all laminations have been extended to make a small air gap. In this position, a high permeability path exists through the pole pair 1-5 and back around through the peripheral area of the field core structure. It is to be noticed that not all laminations are extended to the full periphery of the rotor. Imagine removing the rotor and looking down upon the end of the rotor as suggested by the section line 2—2. The view seen is shown in FIGURE 2. It is seen that the central laminations extend over a 45° sector while the outer laminations extend over a lesser sector, the number of laminations decreasing for each sector as one proceeds outward. As each extended sector passes over a pole piece, the permeability of the path increases linearly until the entire pole is covered and would remain constant until the sector started to uncover the pole piece. However, as the shaft is turned the arrangement shown causes the permeability to increase by a series of straight line segments which vary in slope because the number of laminations for a given sector is varied, so that the actual permeability approximates a sine wave as shown in FIGURE 3.

By varying the sectors and the number of laminations in each, the sine wave can be approximated to any desired degree of perfection. The assembled rotor can further be shaped as by grinding to even further improve the shape of the permeability vs. shaft angle plot as desired.

It is obvious that the voltage induced in the secondary windings will follow the shape of the permeability vs. shaft angle shape identically. With all the secondary coils pairs 12, 14, 16, and 18 connected in series as shown, all these individual voltages are automatically added so that again, assuming all solenoids pairs to be identical $$e_o = Ke_i \sin \alpha \sin \omega t + Ke_i \sin (\alpha - \pi/2) \sin (\omega t - \pi/2)$$

which is equivalent to $$e_o = Ke_i \sin (\omega t + 2\alpha)$$

It is obvious that by adding more poles to the field and reducing the largest sector of the rotor that this provides a device in which:

$$e_o = Ke_i \sin (\omega t + n\alpha)$$

where $n$ is any integer and $K$ is a design constant.

Figure 4:
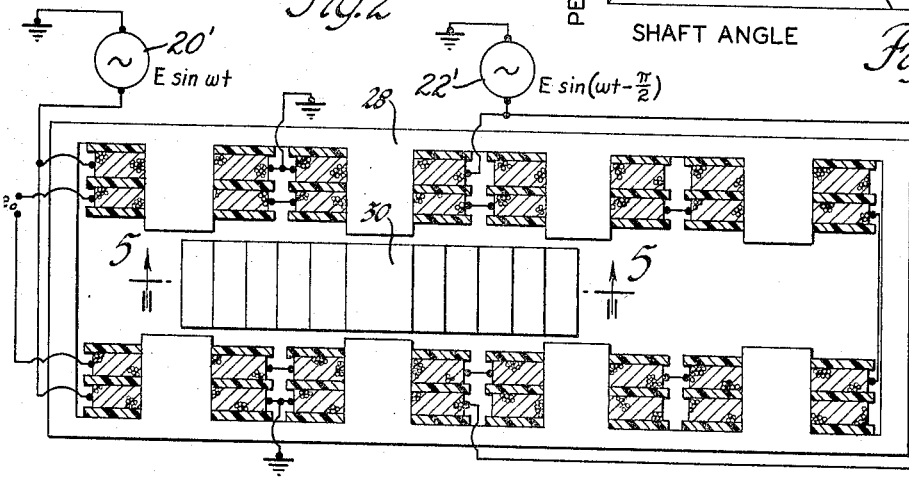
FIGURE 4 is a cross-sectional view of a linear displacement detecting device.
Figure 5:
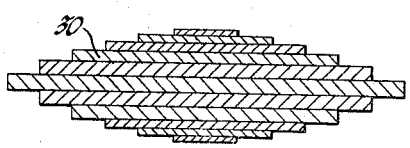
FIGURE 5 is a sectional view of the displaceable body of the detector shown in FIGURE 4 and taken along a line 5—5 of FIGURE 4.

In FIGURE 4, a version of this same resolver is shown which has been arranged to measure linear rather than angular displacements in terms of phase angle. The eight pole circular stator is replaced by the linear stator 28. The same type of windings are applied to these pole pieces as were specified for the device of FIGURE 1. The windings include sets of primary and secondary windings and are energized in a manner similar to that of the FIGURE 1 device by means of quadrature voltage sources 20' and 22'. As exemplified in FIGURE 4, source 20' is connected to the primary windings of every other set of transverse poles and source 22' is connected to the remaining primary windings. This connection produces a linearly moving magnetic field in the same manner as the FIGURE 1 system produces a rotating magnetic field. The secondary windings are also connected in series to produce an output voltage $e_o$ which varies in phase according to the linear position of the core section 30 within the air gap between the transverse poles. The shaped rotor is replaced by a movable core section 30, shaped by varying the length of the laminations as shown by the half section 5—5. The theory of operation of this device is identical to that just described in connection with FIGURES 1 through 3. By direct analogy it is clear that this device will produce an output voltage $e_o$ whose phase with respect to the excitation voltage which is directly proportional to the linear displacement of the movable core section.

While the invention has been described with reference to specific embodiments thereof, it is contemplated that various modifications to these embodiments may occur to those skilled in the art which do not depart from the spirit and scope of the invention. For a definition of the invention reference should be had to the appended claims.

I claim:

1. Displacement measuring apparatus comprising a plurality of pairs of opposed salient poles, each of the poles in the pairs facing one another but spaced apart to define a gap therebetween, a body of magnetic material, means for permitting relative motion of the body with respect to the pole pairs in the gaps formed thereby, primary winding means disposed on at least one of the poles in each of the pairs, secondary winding means disposed on at least one of the poles in each of the pairs to be linked magnetically with the primary winding means of the pair to a degree dependent upon the orientation of the body between the poles of the pair, supply means for exciting each of the primary winding means with a voltage which is phase-shifted from the adjacent pole pair winding means by a predetermined electrical angle, and means connecting the secondary winding means in series relation to provide an output voltage which varies in phase according to the displacement of said body relative to the pole pairs.

2. Displacement measuring apparatus comprising a closed magnetic structure defining a plurality of spaced salient magnetic poles extending toward a transversely opposite portion of the structure but separated therefrom by an air gap, a body of magnetic material adapted for displacement through the gaps between the poles and the transversely opposite portion, a primary and a secondary winding disposed on each of the poles and being magnetically linked to a degree depending upon the orientation of the displaceable body in the gap adjacent the pole, means for exciting each of the primary windings with a voltage which is phase-shifted from the voltage in the adjacent primary by a predetermined electrical angle, and means connecting the secondary winding means in series relation to provide an output voltage which varies in phase according to the displacement of said body relative to the poles.

3. Resolver apparatus comprising a generally annular stator of magnetic material having formed therein a plurality of inwardly extending salient poles, the poles being circularly disposed about a central axis to form a plurality of diametrically opposed pairs of poles each having an air gap therebetween, a rotor of magnetic material having diametrically opposed salient poles portions and mounted centrally to the stator and rotatable about an axis to selectively occupy the gap between the pairs of diametrically opposite poles, a primary winding disposed on at least one pole of each of the pole pairs, a secondary winding disposed on at least one pole of each of the pole pairs to be magnetically linked with the primary winding of the pole pair to a degree dependent upon the angular position of the rotor between the poles of the pair, means for exciting each of the primary windings with a voltage of fixed amplitude but phase-shifted from the voltage on the adjacent primary winding by a predetermined electrical angle, and means connecting the secondary winding means in series relation to provide an output voltage which varies in phase according to the displacement of said body relative to the pole pairs.

4. Apparatus as defined in claim 3 wherein four pairs of opposing poles are formed symmetrically about the stator and the predetermined electrical angle is 90 degrees.

5. Apparatus as defined in claim 3 wherein the rotor is constructed of an axial stack of laminations, each lamination having two diametrically opposite salient pole portions co-diametric with the corresponding portions of the other laminations, the circumferential dimensions of the pole portions being axially graduated thereby to present areas to each of the poles of the pair adjacent the rotor which vary approximately sinusoidally with angular displacement of the rotor.

6. Multi-speed resolver apparatus comprising a generally annular stator of magnetic material and having a central axis of symmetry, a plurality of diametrically opposing pairs of inwardly extending salient poles symmetrically formed on the stator about the axis thereof, the poles of each of the pairs being radially spaced to form a gap therebetween, a rotor of magnetic material having two opposite salient poles and being rotatable about the axis to occupy positions between the poles of said pairs, a primary and a secondary winding disposed on each of the stator poles, means for producing a reference voltage and a second voltage in quadrature therewith, means for connecting the reference voltage in an alternatingly opposite phase relation to the primary windings of the odd pairs of stator poles, and means for connecting the second voltage in alternatingly opposite phase relation to the primary windings of the even pairs of stator poles.

7. Apparatus as defined in claim 6 wherein the rotor is constructed of a stack of laminations, each lamination having diametrically opposite salient pole portions, the circumferential dimensions of the pole portions of the laminations being axially graduated thereby to present to the adjacent stator poles a circumferential area which varies approximately sinusoidally with angular displacement of the rotor.

8. Linear displacement sensing apparatus comprising a stator of magnetic material having formed thereon a plurality of linearly disposed pairs of salient poles, the poles of each of the pairs extending toward one another but separated by a gap, a member of magnetic material disposed between the poles of said pairs and displaceable linearly with respect to the pairs, a primary and a secondary winding disposed on each of the poles, means for producing a reference voltage and a second voltage in quadrature therewith, means for connecting the reference voltage in alternatingly opposite phase relation to the primary windings of odd pairs of poles, and means for connecting the second voltage in alternatingly opposite phase relation to the primary windings of even pairs of poles.

9. Apparatus as defined in claim 8 wherein the displaceable member is constructed of a stack of laminations, the linear dimension of the laminations being graduated thereby to present an area to each of the faces of the pole pairs adjacent the member which varies approximately sinusoidally with linear displacement of the member with respect to the pole pairs.

References Cited by the Examiner
UNITED STATES PATENTS

| | | | |
|---|---|---|---|
| 2,427,213 | 9/1947 | Jewell | 323—90 |
| 2,882,484 | 4/1959 | Swainson | 323—51 |
| 2,941,140 | 6/1960 | Rudolf et al. | 323—51 |
| 2,996,688 | 8/1961 | Boyd | 323—90 X |
| 3,001,127 | 9/1961 | Pitches et al. | 323—90 |
| 3,045,196 | 7/1962 | Packard | 336—135 |

JOHN F. COUCH, *Primary Examiner.*

MILTON O. HIRSHFIELD, *Examiner.*

W. E. RAY, *Assistant Examiner.*